(12) United States Patent
French et al.

(10) Patent No.: US 6,396,594 B1
(45) Date of Patent: May 28, 2002

(54) METHOD FOR PROVIDING FLEXIBLE AND SECURE ADMINISTRATOR-CONTROLLED WATERMARKS

(75) Inventors: Steven M. French; Lorin E. Ullmann, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,874

(22) Filed: Mar. 31, 1999

(51) Int. Cl.[7] .............................................. G06K 15/00
(52) U.S. Cl. ..................................... 358/1.18; 358/1.13
(58) Field of Search ......................... 358/1.1, 1.9, 1.18, 358/1.13, 1.15, 455, 452, 453, 537, 538; 382/100, 101, 205, 232; 710/52, 40, 29, 57; 399/181; 101/141

(56) References Cited

U.S. PATENT DOCUMENTS

| 5,644,682 A | 7/1997 | Weinberger et al. ........ 395/101 |
| 5,664,018 A | 9/1997 | Leighton ..................... 380/54 |
| 5,689,626 A | 11/1997 | Conley ........................ 395/117 |
| 5,708,717 A | 1/1998 | Alasia ......................... 380/51 |
| 5,860,047 A * | 1/1999 | Hernandez ................... 347/131 |
| 6,260,102 B1 * | 7/2001 | Robinson .................... 710/10 |

* cited by examiner

Primary Examiner—Arthur G. Evans
(74) Attorney, Agent, or Firm—Jeffrey S. LaBaw; Bracewell & Patterson, L.L.P.

(57) ABSTRACT

A watermark property is specified for a print queue, subject to control only by network administrators. The value within the watermark may be a pointer to a graphic image, text, or a logical value, allowing flexible specification of a watermark on a printer by printer basis. The queue watermark property overrides any print job watermark properties before the print job is submitted to the print driver, regardless of whether the print job watermark was set in the job properties locally or remotely, by a user or an application. The queue watermark property thus serves as a distinct, mandatory watermark associated with the print queue, whether local or network. The watermark property setting is retained by a persistent parameter in configuration information for the print server hosting the print queue, which is employed to initialize the queue. As a queue property, which ordinary users will not normally be permitted to control, the watermark property may be protected from modification or circumvention by any user not having network administrator status.

22 Claims, 6 Drawing Sheets

METHOD FOR PROVIDING FLEXIBLE AND SECURE ADMINISTRATOR-CONTROLLED WATERMARKS

BACKGROUND OF THE INVENTION

1. Technical Field

The present invention relates in general to printing of paper hardcopy output from data processing systems and in particular to printing of watermarks on hardcopy output from data processing systems. Still more particularly, the present invention relates to consistently forcing watermarks to be printed under administrative control on print jobs submitted to selected printers or print queues.

2. Description of the Related Art

Watermarks are among various security mechanisms, including wax seals and embossing (such as by a notary public's seal), long used for source identification or similar control over printed matter. Traditional watermarks are markings in paper resulting from differences in thickness, usually produced by the differential pressure of a projecting design on a processing roll during paper manufacture and visible when the paper is held up to the light or viewed at certain angles with respect to incident light. Contemporary "watermarks," which are simply preselected, recognizable text or graphics overlaid on other printed matter, originated with xerographic (copier) hardware, which permitted configuration of such watermarks by a keypad and/or display.

In contemporary desktop publishing or printing, watermarks are text or graphics overlaid on an application-rendered page to be printed. Some commercial word processor applications support the creation of watermarks overlaid on a print job in a manner analogous to page numbering or headers/footers, but at the control of the user and with no override at a printer or network print queue. These watermarks are application dependent and not administrator controlled. Printer hardware has not been provided with the option of hardware configurable watermarks analogous to xerographic mechanisms.

In an information kiosk environment such as a university transcript office or Olympic kiosk, the ability to consistently force the printing of watermarks may be of significant value. Guaranteeing that watermarks are printed for specific printers or print queues may reduce the possibility of fraudulent printing of "official" documents, such as university transcripts.

In a network computing environment, watermarks may reduce waste and enforce enterprise printer restrictions, for example by printing the used, hostname and printer name in the watermark on every page of a print job. Printer resources such as toner and paper are a significant business expense in many enterprises, especially for emerging high quality color printers which are pervasive and very expensive to operate.

In many enterprises, forced printing of watermarks may serve as a security mechanism for proprietary information. For example, printer-specific watermark variances which are undetectable without minute examination or comparison may serve to identify which printer was employed to print information recovered from a source to which it was leaked, narrowing the number of individuals who could have been the source of the hardcopy recovered.

Forced watermarks could also limit enterprise liability when dispersing information. For example, watermarks containing the phrases "DRAFT", "UNAPPROVED", or "USE WITH CAUTION UNTIL APPROVED" could be consistently printed on print outs for jobs generated by most users in an enterprise, with the watermark suppressed on when a particular user having authority to approve the information released prints the document.

It would be desirable, therefore, to provide a mechanism for consistently printing a watermark, without regard to user selected print job properties, on print jobs submitted to a printer or print queue.

SUMMARY OF THE INVENTION

It is therefore one object of the present invention to provide improved printing of paper hardcopy output from data processing systems.

It is another object of the present invention to provide improved printing of watermarks on hardcopy output from data processing systems.

It is yet another object of the present invention to provide a mechanism for consistently forcing watermarks to be printed under administrative control on print jobs submitted to selected printers or print queues.

The foregoing objects are achieved as is now described. A watermark property is specified for a print queue, subject to control only by network administrators. The value within the watermark may be a pointer to a graphic image, text, or a logical value, allowing, flexible specification of a watermark on a printer by printer basis. The queue watermark property overrides any print job watermark properties before the print job is submitted to the print driver, regardless of whether the print job watermark was set in the job properties locally or remotely, by a user or an application. The queue watermark property thus serves as a distinct, mandatory watermark associated with the print queue, whether local or network. The watermark property setting is retained by a persistent parameter in configuration information for the print server hosting the print queue, which is employed to initialize the queue. As a queue property,, which ordinary users will not normally be permitted to control, the watermark property may be protected from modification or circumvention by any user not having network administrator status.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
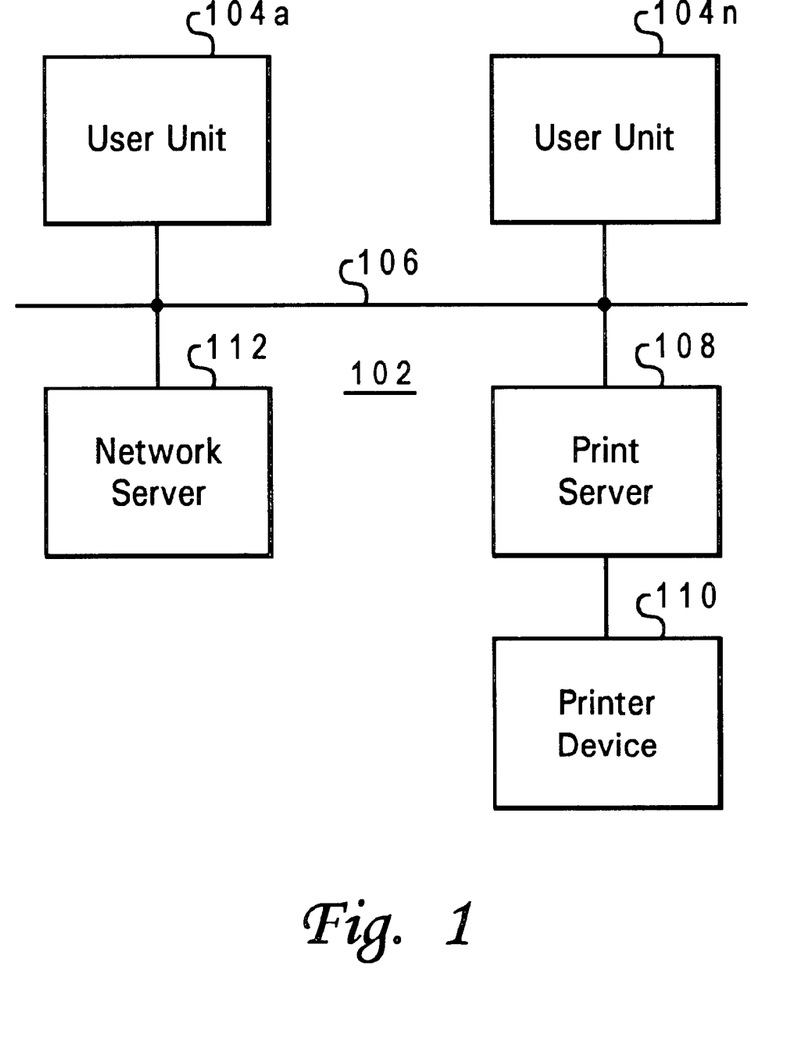
FIG. 1 depicts a block diagram of a data processing system network in which a preferred embodiment of the present invention may be implemented.

With reference now to the figures, and in particular with reference to FIG. 1, a block diagram of a data processing system network in which a preferred embodiment of the present invention may be implemented is depicted. Data processing system network 102 includes a plurality of user units 104a–104n coupled to a common network communications medium 106, such as an Ethernet or frame relay system.

Also coupled to network communications medium is a print server 108, which is connected to printer 110. Print server 108 is depicted in FIG. 1 as a dedicated server system, but may take the form of peer user unit connected to is the network communications medium 106 or server hardware installed within printer 110. Print server 108 includes a print queue to which print jobs are spooled by client systems, such as user units 104a–104n, and serves print requests over network 102 in accordance with the known art.

Network 102 in the exemplary embodiment also includes a network server 112, which may perform various functions in accordance with the known art such as processing login requests by user units 104a–104n for access to network 102, provide communications between network 102 and other networks such as the Internet, etc. However, network server 112 need not be independent of or separate from print server 108 as shown in the exemplary embodiment. The exemplary embodiment shown in FIG. 1 is provided solely for the purposes of explaining the invention and those skilled in the art will recognize that numerous variations are possible, both in form and function. All such variations are believed to be within the spirit and scope of the present invention.

Additionally, the present invention need not be implemented within a network, but may also be implemented within a stand alone data processing system having a direct connection to a printer, such as an information kiosk or a personal computer employed in a user's residence. However, network 102, or the data processing system which is utilized in lieu of network 102, is preferably programmed to provide a mechanism for consistently forcing watermarks to be printed under network administrator control (or the equivalent) on print jobs submitted to selected printers or print queues.

Figure 2:
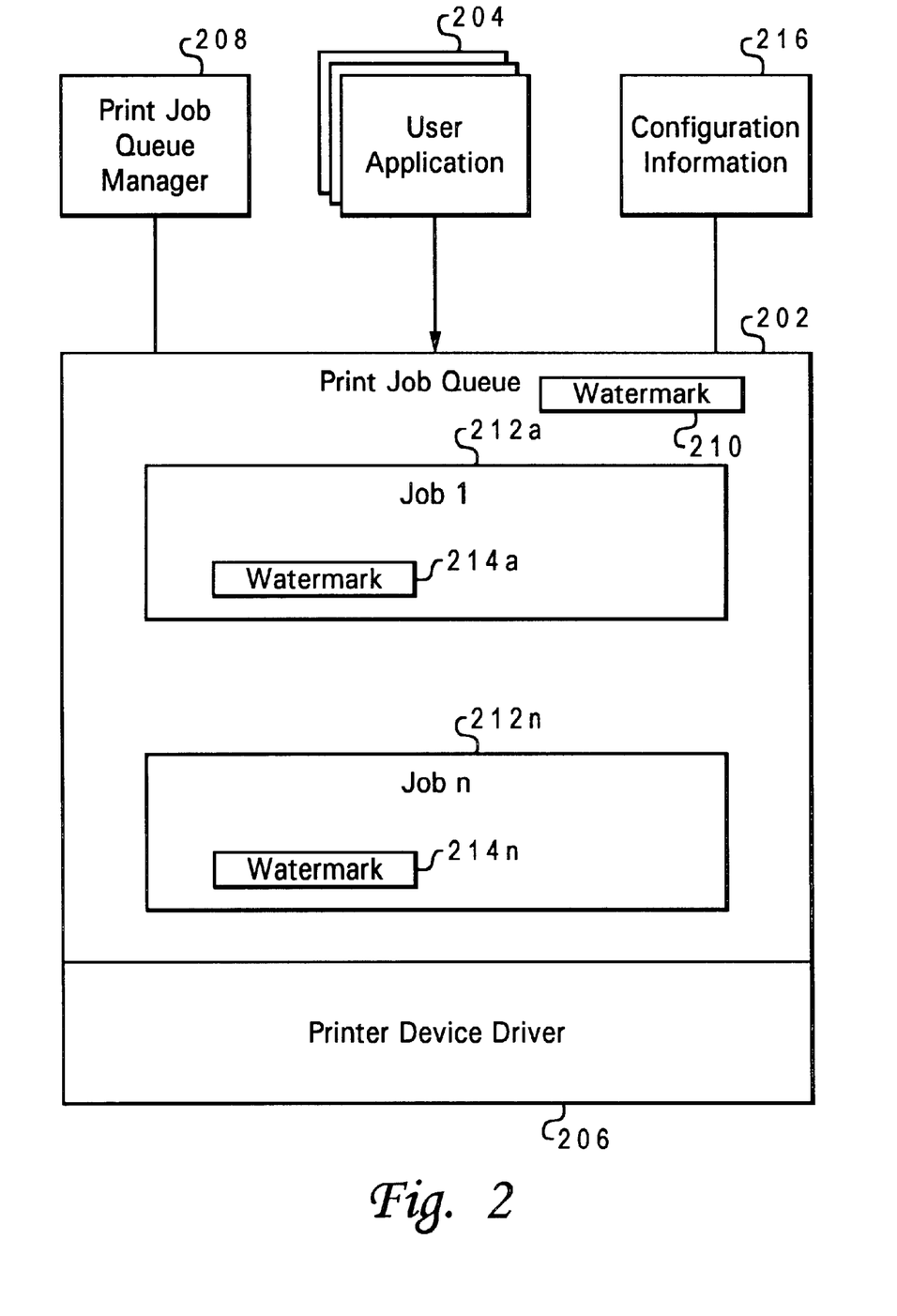
FIG. 2 is a block diagram of a mechanism for consistently forcing watermarks to be printed under administrative control on print jobs submitted to selected printers or print queues in accordance with a preferred embodiment of the present invention.

Referring to FIG. 2, a block diagram of a mechanism for consistently forcing watermarks to be printed under administrative control on print jobs submitted to selected printers or print queues is illustrated. The mechanism includes a print queue 202, which may be implemented within print server 108 depicted in FIG. 1. Print queue 202 is accessible to user applications 204, which may be executing, for example, within any of user units 104a–104n depicted in FIG. 1.

Print queue 202 interfaces with device driver 206 for the printer or printers which are to print a watermark under administrative control. Print queue 202 may spool jobs to more than one printer according to workload, or may have designated primary and backup printers. A queue manager 208 may be employed to control the operation of print queue 202, controlling jobs within print queue 202 or setting properties for print queue 202. Queue manager 208 provides different control over print queue 202, and different user interface controls, based on whether the user has a network administrator status.

Print queue 202 has generally the same properties and functionality of operating system or print server print queues known in the art, such as job control (kill, etc.) and properties controlling the printing of separator pages, default fonts, maximum job sizes, and the like. In the present invention, however, print queue 202 also includes a watermark property 210. Watermark property 210 is subject to control only by users having network administrator status, or a list of authorized users given explicit permission by a network administrator to administer a print queue. (Some operating systems use the designation "print operator" to identify a subset of users who; although not full network administrators, are granted permission to control print queues or a particular print queue and can therefore modify a print queue's properties. As used herein, "network administrator" includes such users and is intended to refer to those users granted explicit permission to modify a print queue's properties.)

Watermark property 210 may contain a pointer to a graphic image, text, or a logical value for printing the used, printer name or identifier, etc. Watermark property 210 may not be modified or circumvented by an ordinary users having access to print queue 202, but specifies a distinct, mandatory watermark associated with print queue 202, regardless of whether print queue 202 is local or remote.

The source of print jobs to print queue 202 may be an LPR Print Request to a shared LPD print queue, to be rendered before sending the print job to the LPD queue, a shared printer request copied to a net used port such as LPT1, a local application print request to be rendered and sent to a local printer on the client or server, or a remote application print request from the client to be rendered for a printer on the server. Print queue 202 enforces the secure queue watermark during print job processing. The output of print queue 202 may be sent to either a local or remote printer, which may be shared via LPD or shared via a local area network (LAN) using any variety of print protocols such as Shared Message Block (SMB) including Common Insecurities Fail Scrutiny (CIFS).

Print jobs 212a–212n submitted to print queue 202 may also include user application-specified watermark properties 214a–214n. However, watermark property 210 for print queue 202 overrides any such watermark properties 214a–214n which may be specified by user applications. In transmitting print jobs 212a–212n to device driver 206, print queue 202 suppresses or overrides the watermark values 214a–214n specified for such print jobs 212a–212n and substitute the watermark property 210 value specified for print queue 202 by a user having network administrator status. The device driver 206 content producers—e.g., Printer Control Language (PCL) or PostScript drivers—will then overlay the watermark specified in queue watermark property 210 on top of the application requested graphics class drawing primitives. User application specified watermarks properties 214a–214n may be utilized when queue watermark property 210 is null. Otherwise, however, queue watermark property 210 unconditionally overrides any other watermark property, whether set in job properties locally or remotely, by a user or by an application.

A parameter within operating system configuration information 216 for a system hosting print queue 202 allows the print queue 202 to retain the existing value of watermark property 216 when print queue 202 is shut down. Network computers which permit "peer" workstation printers to share their printers across the network may implement the watermark mechanism in a distributed fashion, within each local print queue, with the peer hosting the printer specifying the watermark property value. Queue defaults for watermarks may be automatically enabled and secured from server based network configurations or may be configured from administrative workstations.

Systems supporting multiple operating systems, such as Windows and DOS, should preferably support queue watermark property 210 in both operating systems, with appropriate GUI or CLI controls provided for administrative users in both operating systems. For JavaOS, a configuration bean may be provided defining the security watermark, set by the administrator utilizing the Java Configuration Tool (JCT). The persistent queue watermark information may be stored in the JSD, with Get and Set methods private and not exposed to the application layer.

Figure 3:
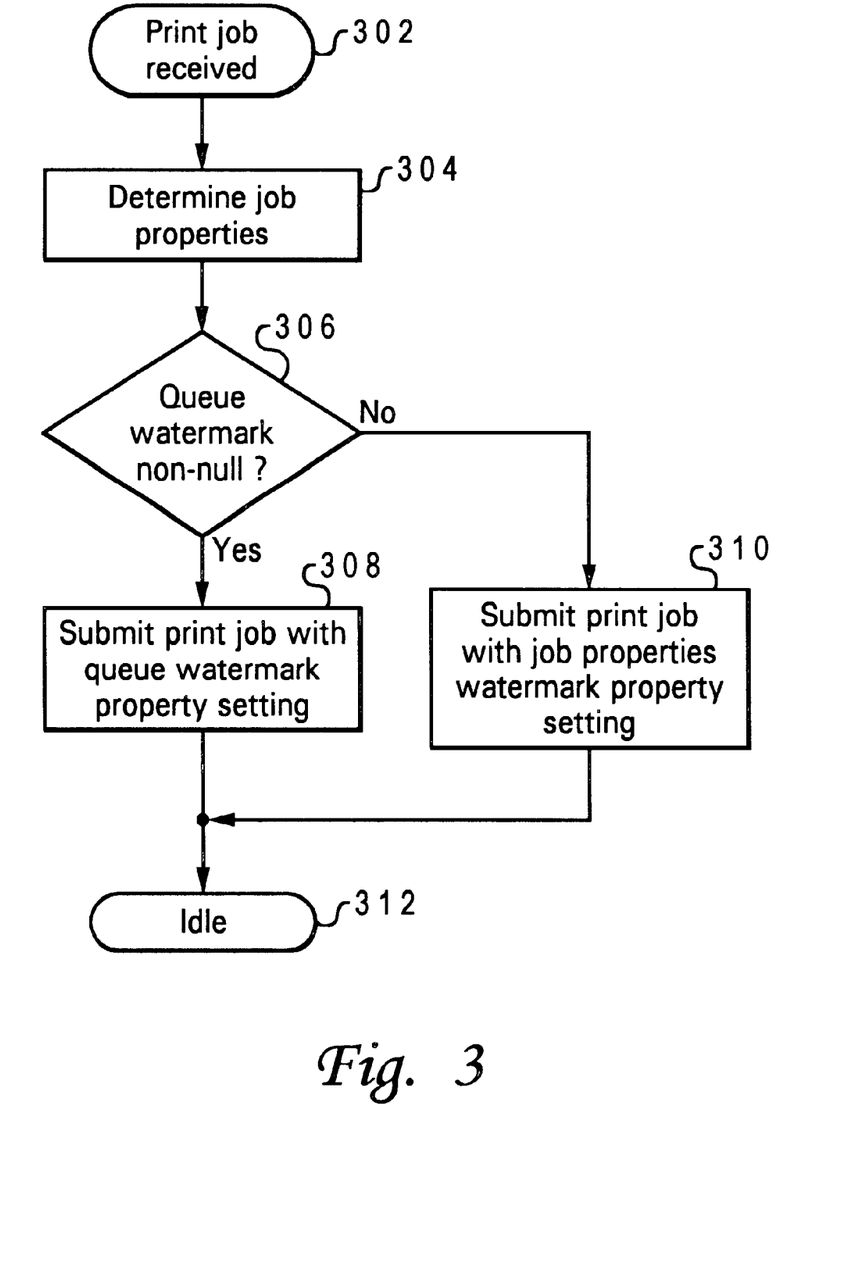
FIG. 3 depicts a high level flow chart for a process of employing administrator-controlled queue watermark properties in accordance with a preferred embodiment of the present invention.

With reference now to FIG. 3, a high level flow chart for a process of employing administrator-controlled queue watermark properties in accordance with a preferred embodiment of the present invention is depicted. The process begins at step 302, which depicts a print job being received by a queue including a watermark property in accordance with the present invention.

The process first passes to step 304, which illustrates determining job properties for the print job, including any watermark property specified by a user or a user application. The process then passes to step 306, which depicts a determination of whether the print queue receiving the print job includes a non-null watermark property.

If a non-null queue watermark property is identified, the process proceeds to step 308, which illustrates submitting the received print job to the print driver with the queue watermark properties substituted for any user or application specified watermark properties within the print job. However, if the queue watermark property is null, the process proceeds instead to step 310, which depicts submitting the print job to the print driver with the job properties specified in the print job, including any user or application specified watermark.

As noted above, the print driver employs the specified watermark property, whether taken from the queue or the print job, to overlay the watermark on top of the application rendered page before spooling the print job to the printer associated with the queue. From either of steps 308 or 310, the process then passes to step 312, which illustrates the process becoming idle until another print job is received by the queue.

A sample code flow for employing secure, flexible queue watermarks in accordance with the present invention are provided below. During configuration or installation of a printer queue on a client, server, network computer, or the management of a collection of diverse operating systems and hardware, the watermark data is entered by the administrator for the print queue. For JavaOS, this may be done through the Java Configuration Tool; for OS/2 server/clients, through the Print Object GUI; for IBM's WorkSpace On-Demand (WSOD), through the Print Object GUI on the client desktop or WSOD Manager GUI for installing/configuring clients; and for Windows NT, through the Printer Queue security page. The watermark property specified by the print queue administrator is stored in a secure database. For JavaOS, this may be the JavaOS System Database; for OS/2 Server, the configuration file "OS2.ini"; and for WSOD, the parameters "AppParms" within the configuration file "client.ini". The watermark property is only editable after installation by an administrator for the print queue, and is utilized for every print job rendered in the print queue.

During print job processing on a client, server, or network computer, job processing proceeds as follows:

If (queue watermark configured):
    Retrieve watermark display data;
    Render Printer specific data;
    Convert watermark data to Printer specific data;
    Send combined watermark data and application-initiated data to printer.

Rendering of the printer specific data is performed by converting application calls—from the PM GPI for OS/2, from the PM GDI for Windows, and from the Java Abstract Windowing Toolkit (AWT) for JavaOS and other Java Virtual Machine (JVM) platforms—into printer specific data such as PCL5 or Postscript by the print subsystem.

The print subsystems also convert watermark data into printer specific data, performs administration calculations, and retrieves information if necessary, such as user, job number, date and time, security classification, letterhead, cost to user, location, etc., which are typically available in the existing operating system.

Figure 4:
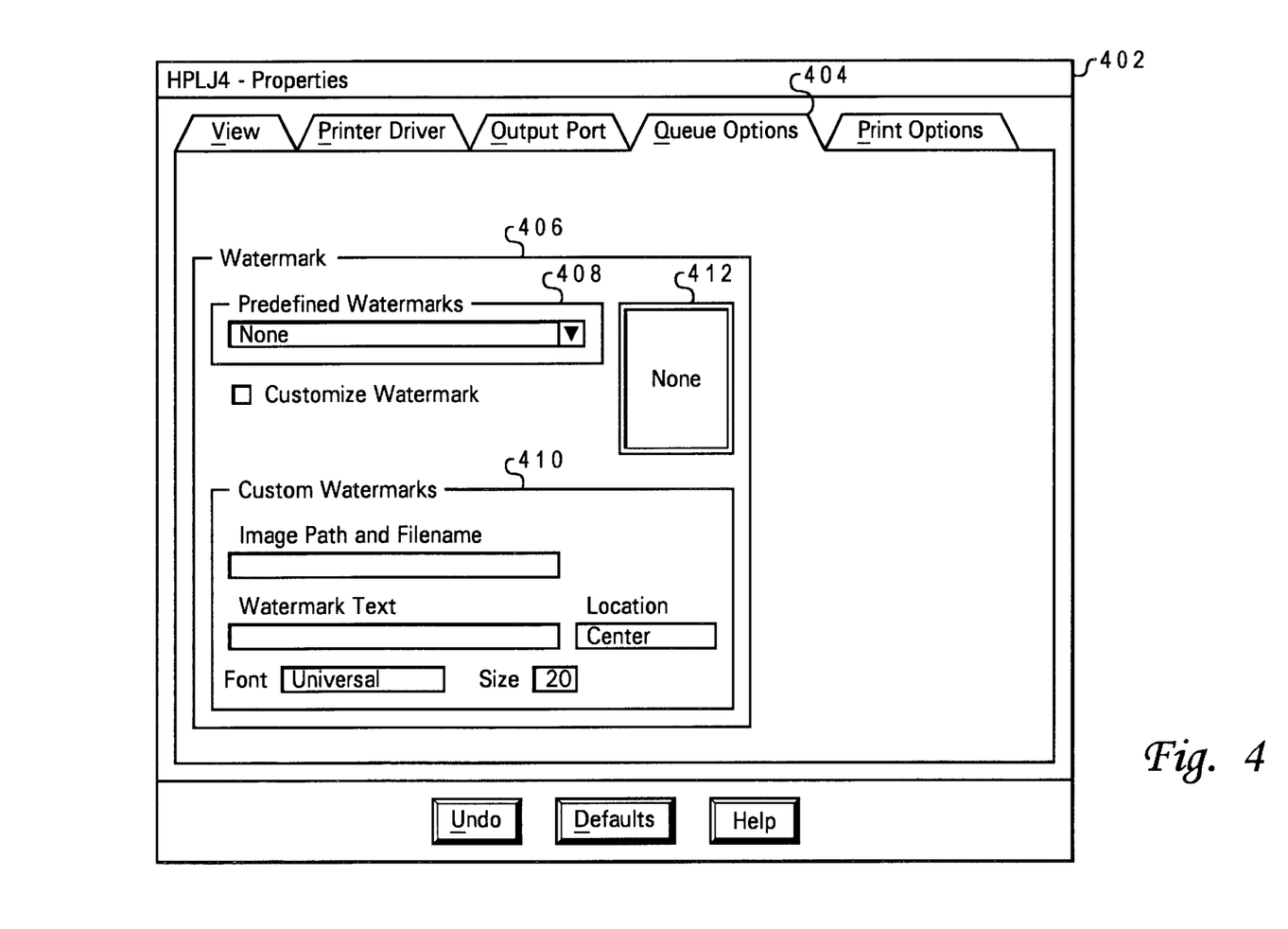
FIG. 4 is a pictorial representation of an administrator user interface for a print queue including a queue watermark property in accordance with a preferred embodiment of the present invention.

Referring to FIG. 4, a pictorial representation of an administrator user interface for a print queue including a queue watermark property in accordance with a preferred embodiment of the present invention is illustrated. User interface 402 in the example depicted employs the card file metaphor common to system controls for operating systems utilizing a graphical user interface (GUI). A "card" or page 404 for selecting queue options includes a section 406 for defining the queue watermark.

The queue watermark may be selected from predefined watermarks 408 or customized utilizing custom controls 410. Custom controls 410 preferably permit selection of a graphic image for the watermark, specification of watermark text, including font type and size, and specification of the watermark location on the page. An image window 412 may also be included for displaying a "thumbnail" image of the selected watermark.

Figure 5A:
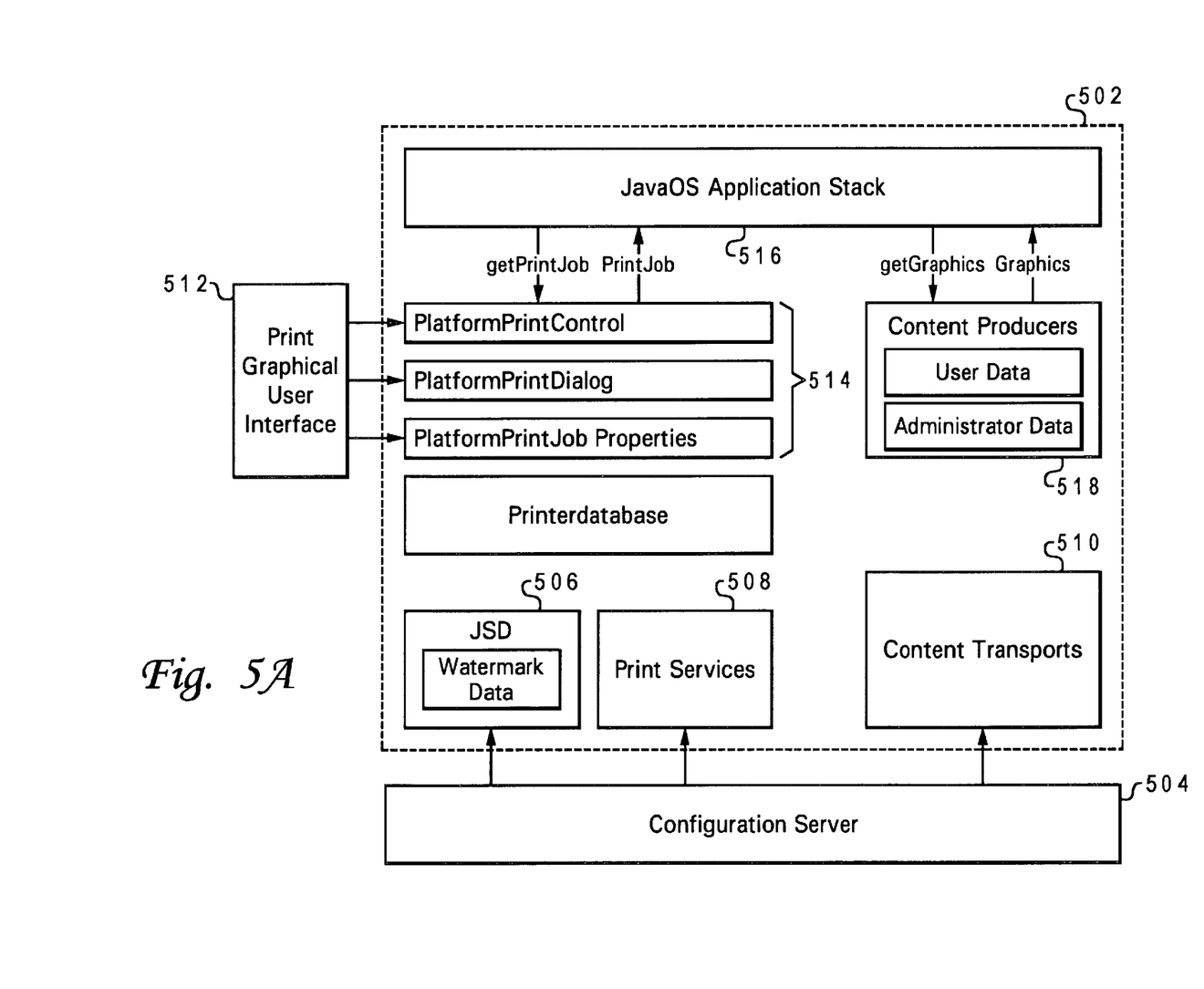
FIGS. 5A–5B are block diagrams for an implementation of queue watermark properties in Java virtual machine environments in accordance with a preferred embodiment of the present invention.
Figure 5B:
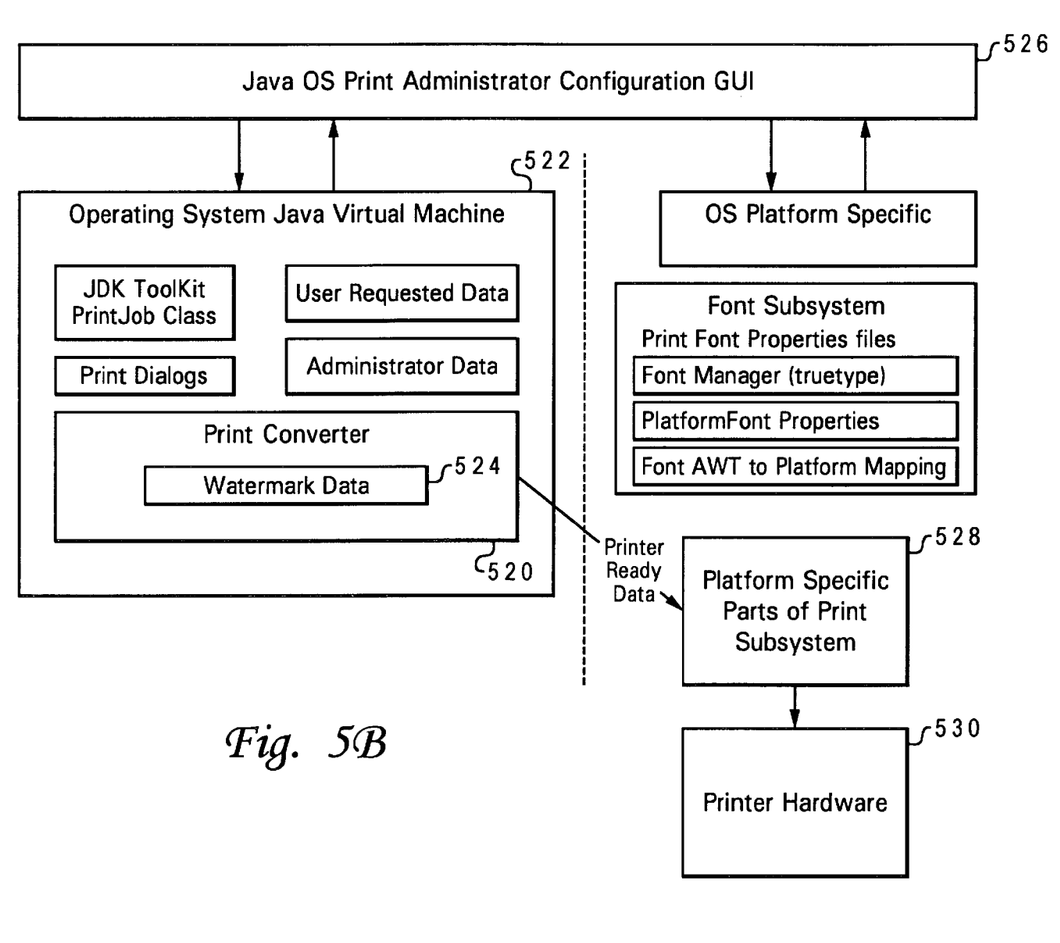

With reference now to FIGS. 5A and 5B, block diagrams for an implementation of queue watermark properties in Java environments in accordance with a preferred embodiment of the present invention are illustrated. FIG. 5A illustrates a JavaOS operating system environment 502. Configuration server 504, where the watermark data is stored and configuration parameters are established by an administrator, sets: default JobProperties and a printer list for JSD 506 (which contains the watermark data); local, LPD, or LPD streaming print services 508; and local parallel, local serial, LPR, or LPR streaming content transports 510.

Print graphical user interface 512 allows the user to actuate print controls 514, which in turn transmit and receive print messages PrintJob and getPrintJob to and from application stack 516. Application stack 516 transmits and receives graphics messages getGraphics and Graphics to and from content producers 518, which is where the watermark data is used to render page images into printer-specific data (e.g., PCL5, Postscript, PCL3, etc.). Content producers 518 include separate user data and administrator data, with the administrator data including the watermark data.

FIG. 5B illustrates a Java client. A print converter 520 within the Java Virtual Machine (JVM) 522 for converting images from the AWT to the printer language contains transports, PrintControl, content producers, Graphics, OutputStream, PrintJob, and PrintService classes, as well as the watermark data 524 to be included during render of printer ready data. Watermark data 524 is specified and stored in print converter 520 by an administrator utilizing the Java OS print administrator configuration GUI 526.

In operation, print converter 520 renders the watermark with the application data into printer ready data, and delivers the combined watermark and application printer ready data directly to the platform specific parts of the print subsystem 528 (e.g., port hardware), which in turn delivers the printer ready data to printer 530. The watermark data may thus be specified for the JVM independent of whether it is specified for the underlying operating system.

The present invention permits unconditional printing of an administrator controlled, queue specific watermark overriding any watermark properties within print jobs submitted to the queue.

While the invention has been particularly shown and described with reference to a preferred embodiment, it will be understood by those skilled in the art that various changes in form and detail may be made therein without departing from the spirit and scope of the invention.

What is claimed is:

1. A method for controlling printing of watermarks, comprising:
   receiving a print job at a print server, the print job including job properties for printing a watermark for the print job;
   determining whether an override for the watermark exists at the print server; and
   responsive to finding an override for the watermark:
      finding override job properties for the watermark; and
      printing the watermark for the print job according to the override job properties.

2. The method of claim 1, wherein the step of receiving a print job at a print server further comprises:
   receiving the print job at a queue for the print server including a queue watermark property.

3. The method of claim 2, wherein the step of determining whether an override for the watermark exists at the print server further comprises:
   determining whether the queue watermark property contains a non-null value.

4. The method of claim 2, wherein the step of printing the watermark for the print job according to the override job properties further comprises:
   submitting the print job to a driver with a value from the queue watermark property for the watermark.

5. The method of claim 2, further comprising:
   preventing a user having less than network administrator status from modifying the queue watermark property.

6. The method of claim 5, wherein the step of preventing a user having less than network administrator status from modifying the queue watermark property further comprises:
   preventing the user from viewing the queue watermark property or a user interface control for modifying the queue watermark control.

7. The method of claim 2, further comprising:
   allowing a user identified in a list of authorized users to modify the queue watermark property.

8. The method of claim 1, further comprising:
   responsive to finding no override for the watermark at the print server, printing the watermark for the print job according to the job properties within the print job.

9. The method of claim 8, wherein the step of printing the watermark for the print job according to the job properties within the print job further comprises:
   printing the watermark according to a watermark property, if any, within the job properties.

10. A system for controlling printing of watermarks, comprising:
    a print server receiving a print job including job properties for printing a watermark for the print job and determining whether an override for the watermark exists at the print server; and
    override job properties for the watermark within the print server,
    wherein the print server, responsive to finding an override for the watermark, finds the override job properties for the watermark and renders the watermark for the print job according to the override job properties.

11. The system of claim 10, wherein the print server receives the print job at a queue including a queue watermark property.

12. The system of claim 11, wherein the print server determines whether an override for the watermark exists at the print server by determining whether the queue watermark property contains a non-null value.

13. The system of claim 11, wherein the print server prints the watermark for the print job according to the override job properties by submitting the print job to a driver with a value from the queue watermark property for the watermark.

14. The system of claim 11, wherein the print server prevents a user having less than network administrator status from modifying the queue watermark property.

15. The system of claim 10, wherein the print server, responsive to finding no override job properties for the watermark at the print server, prints the watermark for the print job according to the job properties within the print job.

16. The system of claim 15, wherein the print server prints the watermark according to a watermark property, if any, within the job properties.

17. A computer program product within a computer usable medium for controlling printing of watermarks, comprising:
    instructions for receiving a print job at a print server, the print job including job properties for printing a watermark for the print job;
    instructions for determining whether an override for the watermark exists at the print server; and
    instructions, responsive to finding an override for the watermark, for:
       finding override job properties for the watermark; and
       printing the watermark for the print job according to the override job properties.

18. The computer program product of claim 17, wherein the instructions for receiving a print job at a print server further comprise:

instructions for receiving the print job at a queue for the print server including a queue watermark property.

19. The computer program product of claim 18, wherein the instructions for determining whether an override for the watermark exists at the print server further comprise:

instructions for determining whether the queue watermark property contains a non-null value.

20. The computer program product of claim 18, wherein the instructions for printing the watermark for the print job according to the override job properties further comprise:

instructions for submitting the print job to a driver with a value from the queue watermark property for the watermark.

21. The computer program product of claim 18, further comprising:

instructions for preventing a user having less than network administrator status from modifying the queue watermark property.

22. The computer program product of claim 17, further comprising:

instructions, responsive to finding no override for the watermark at the print server, for printing the watermark for the print job according to a watermark job property, if any, included in the job properties within the print job.

* * * * *